United States Patent
Sato et al.

(10) Patent No.: US 10,998,701 B2
(45) Date of Patent: May 4, 2021

(54) WIRE BONDING METHOD AND BONDED WIRE

(71) Applicant: Yazaki Corporation, Tokyo (JP)

(72) Inventors: Tomoya Sato, Shizuoka (JP); Hiroshi Aoki, Shizuoka (JP); Naoki Ito, Shizuoka (JP); Yasunori Nabeta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/572,835

(22) Filed: Sep. 17, 2019

(65) Prior Publication Data

US 2020/0091691 A1 Mar. 19, 2020

(30) Foreign Application Priority Data

Sep. 18, 2018 (JP) .............................. JP2018-173639

(51) Int. Cl.
*H02G 1/14* (2006.01)
*B23K 20/10* (2006.01)
*H02G 15/08* (2006.01)

(52) U.S. Cl.
CPC .............. *H02G 1/14* (2013.01); *B23K 20/10* (2013.01); *H02G 15/08* (2013.01)

(58) Field of Classification Search
CPC ........... H02G 1/14; H02G 15/08; B23K 20/10
USPC ....................................................... 174/84 R
See application file for complete search history.

(56) References Cited

U.S. PATENT DOCUMENTS

| 6,588,646 | B2 * | 7/2003 | Loprire | B23K 20/10 228/110.1 |
| 9,112,286 | B2 * | 8/2015 | Torimoto | B23K 20/10 |
| 2006/0208033 | A1 * | 9/2006 | Welter | B23K 11/002 228/110.1 |
| 2012/0205423 | A1 * | 8/2012 | Takayama | H01R 43/0207 228/111 |
| 2013/0000949 | A1 * | 1/2013 | Torimoto | B23K 20/106 174/113 R |
| 2016/0136753 | A1 * | 5/2016 | Ruhl | B23K 20/2333 228/110.1 |

FOREIGN PATENT DOCUMENTS

| EP | 3572177 | | * 11/2019 | |
| EP | 3572177 A1 | * 11/2019 | ............. B23K 20/10 |
| JP | 08031469 | * 2/1996 | |
| JP | 9-027377 A | 1/1997 | |
| JP | 9-082375 A | 3/1997 | |
| JP | 2013-118196 A | 6/2013 | |
| JP | 2016-201313 A | 12/2016 | |

* cited by examiner

*Primary Examiner* — Timothy J Thompson
*Assistant Examiner* — Michael F McAllister
(74) *Attorney, Agent, or Firm* — Sughrue Mion, PLLC (57) ABSTRACT

A wire bonding method includes: arranging a first core including a plurality of strands exposed from an insulating sheath of a first wire, onto a side of an anvil and a second core including a plurality of strands exposed from an insulating sheath of a second wire, onto a side of a horn for ultrasonic bonding, the second core being larger in sectional area than the first core; and bonding the first core and the second core together by ultrasonic bonding between the horn and the anvil.

5 Claims, 8 Drawing Sheets

WIRE BONDING METHOD AND BONDED WIRE

CROSS REFERENCE TO RELATED APPLICATIONS

The present application claims priority to Japanese Patent Application No. 2018-173639 filed on Sep. 18, 2018, the entire contents of which are incorporated by reference herein.

BACKGROUND

Technical Field

The present invention relates to a wire bonding method of ultrasonically connecting exposed cores of a plurality of wires together and a bonded wire.

Related Art

Figure 12A:
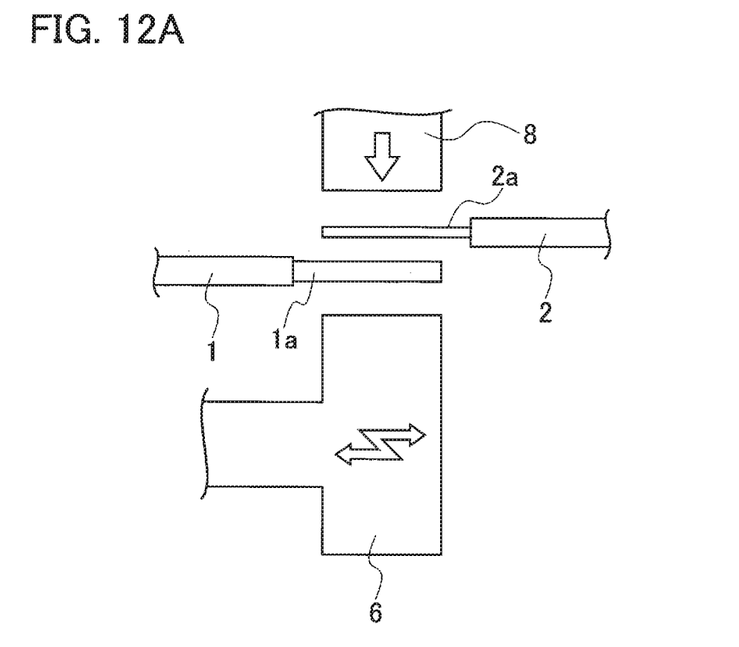
FIG. 12A is a schematic view of main portions in temporary bonding in a conventional wire bonding method.
Figure 12B:
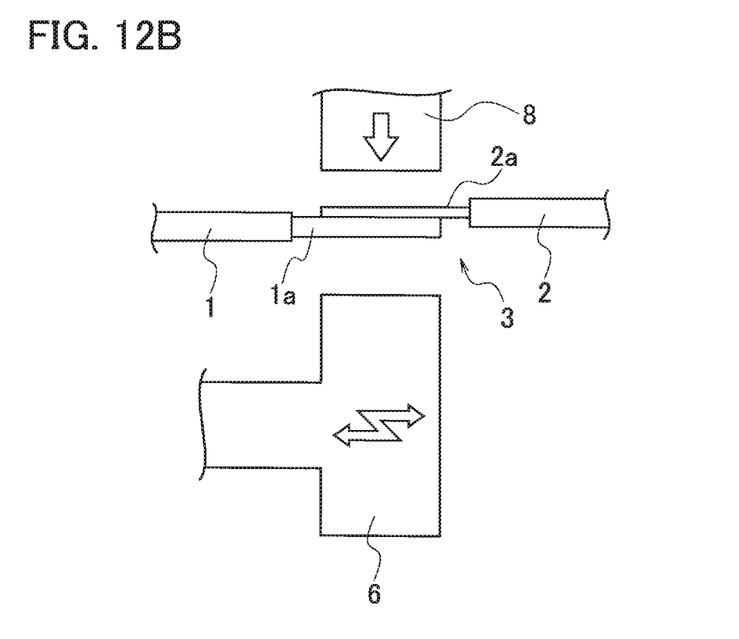
FIG. 12B is a schematic view of the main portions in bonding.

An example of this type of wire connecting method is disclosed in JP 2013-118196 A. As illustrated in FIGS. 12A and 12B, the wire connecting method includes: peeling respective insulating sheaths of a wire 1 and an ultrafine wire 2 to expose cores (conductors) 1a and 2a (preparing); as illustrated in FIG. 12A, pinching the exposed cores 1a and 2a of the wire 1 and the ultrafine wire 2 with a horn 6 and an anvil 8 to pressurize the exposed cores 1a and 2a, and, as illustrated in FIG. 12B, ultrasonically bonding the cores 1a and 2a of the wire 1 and the ultrafine wire 2 together by ultrasonic vibration energy smaller than ultrasonic vibration energy at bonding, to acquire a temporarily bonded body 3 (temporary bonding); and ultrasonically re-bonding the temporarily bonded body 3 acquired at the temporary bonding, by the ultrasonic vibration energy larger than the ultrasonic vibration energy at the temporary bonding, resulting in completion.

The ultrafine wire 2 close to the anvil 8 at the ultrasonic bonding during the bonding, is less likely to break due to contact with the horn 6, so that the ultrafine wire 2 can be ultrasonically bonded with the possibility of cutting reduced.

SUMMARY

However, the conventional wire connecting method requires the temporary bonding after the preparing but before the bonding, resulting in a rise in the number of steps and a rise in cost. In addition, the strength of a bonded portion with the core 1a of the other wire 1, is likely to deteriorate.

Thus, the present invention has been made in order to solve the problem, and an object of the present invention is to provide a wire bonding method capable of bonding cores of a plurality of wires together simply at low cost without breaking, the wire bonding method enabling inhibition of the bonded portion between the cores from deteriorating in strength, as much as possible.

According to an embodiment of the present invention, provided is a wire bonding method including: arranging a first core including a plurality of strands exposed from an insulating sheath of a first wire, onto a side of an anvil for ultrasonic bonding and a second core including a plurality of strands exposed from an insulating sheath of a second wire, onto a side of a horn for ultrasonic bonding, the second core being larger in sectional area than the first core; and bonding the first core and the second core together by ultrasonic bonding between the horn and the anvil.

According to an embodiment of the present invention, provided is a bonded wire including: a first wire having a first core including a plurality of strands exposed from an insulating sheath of the first wire; and a second wire having a second core including a plurality of strands exposed from an insulating sheath of the second wire, the second core being larger in sectional area than the first core, in which the first core and the second core are bonded together by ultrasonic bonding between a horn and an anvil for ultrasonic bonding with the second core arranged on a side of the horn and the first core arranged on a side of the anvil, and the plurality of strands of the second core on the side of the horn is bonded with collapse stronger than collapse of the plurality of strands of the first core on the side of the anvil.

According to an embodiment of the present invention, the number of steps can be reduced in comparison to the conventional method, and a plurality of cores is boned together simply at low cost without breaking. In addition, the bonded portion between the cores can be inhibited from deteriorating in strength, as much as possible.

DETAILED DESCRIPTION

Embodiments of the present invention will be described below on the basis of the drawings.

Figure 1A:
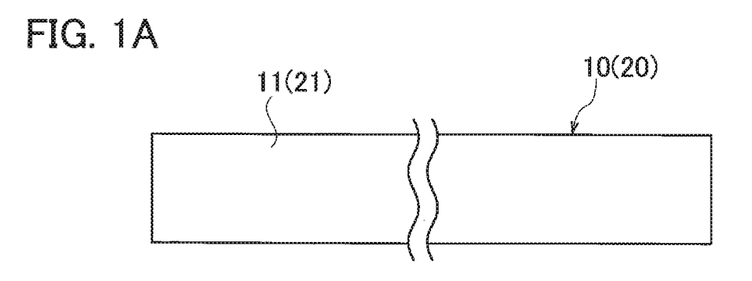
FIG. 1A is a side view of a wire used in a wire bonding method according to a first embodiment of the present invention.
Figure 1B:
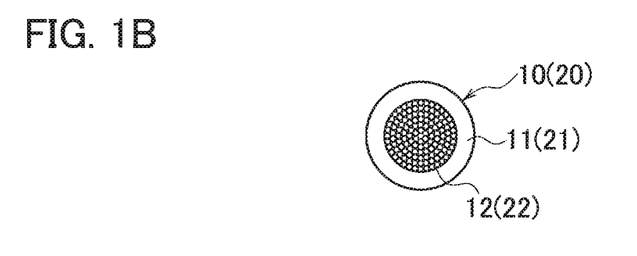
FIG. 1B is a front view of the wire.
Figure 2A:
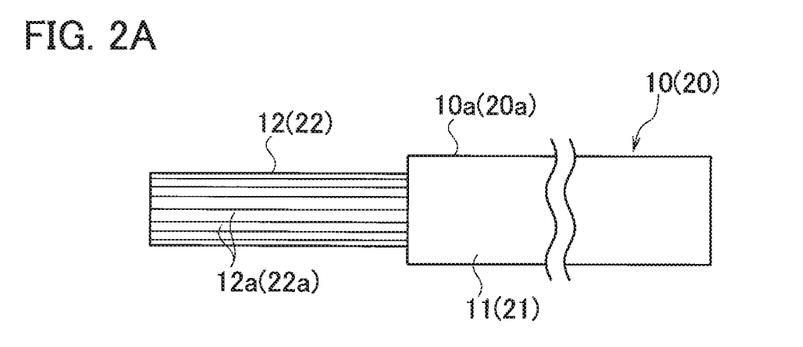
FIG. 2A is a side view of the wire having an insulating sheath peeled at a first end.
Figure 2B:
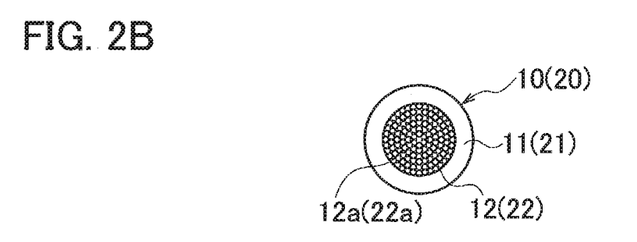
FIG. 2B is a front view of the wire.
Figure 3:
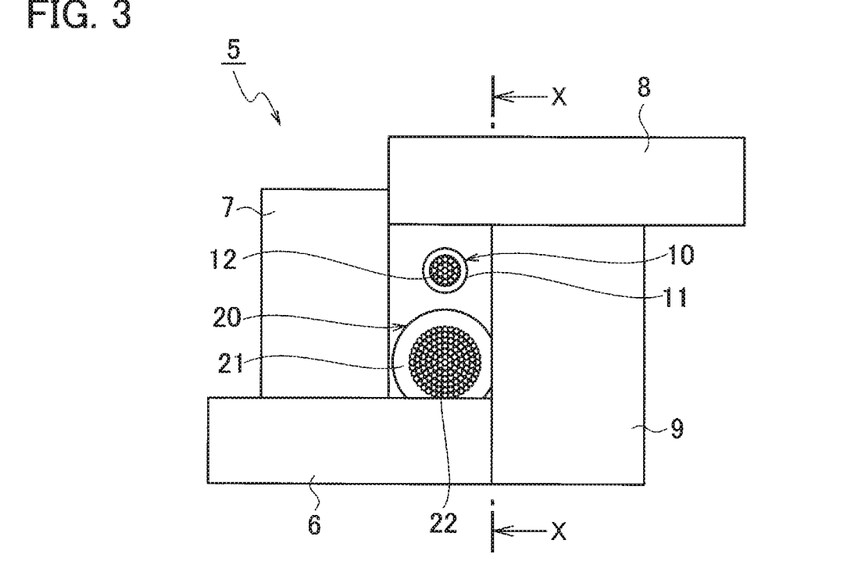
FIG. 3 is a front view of two different-size wires set between a horn and an anvil in an ultrasonic bonder used in the wire bonding method according to the first embodiment.
Figure 4:
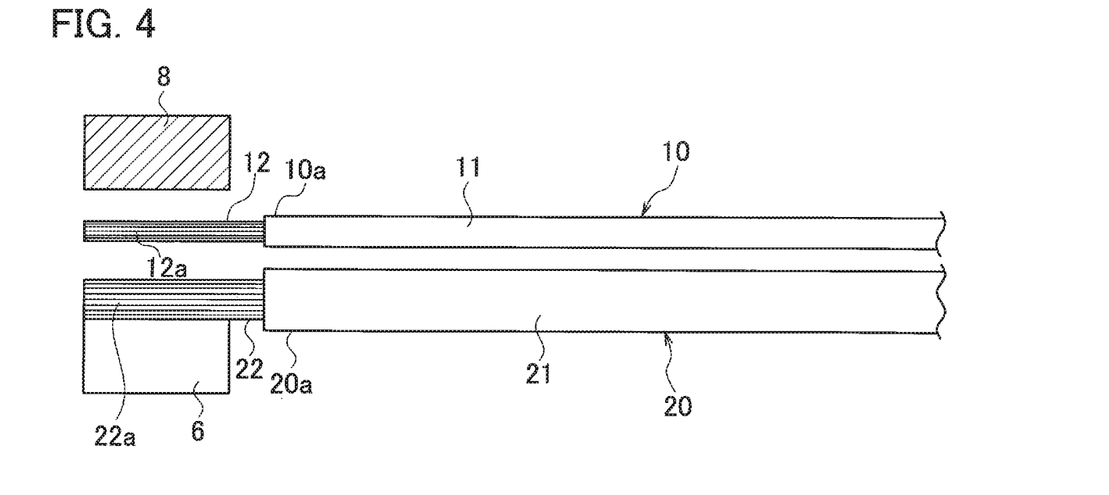
FIG. 4 is a sectional view taken along line X-X of FIG. 3.
Figure 5:
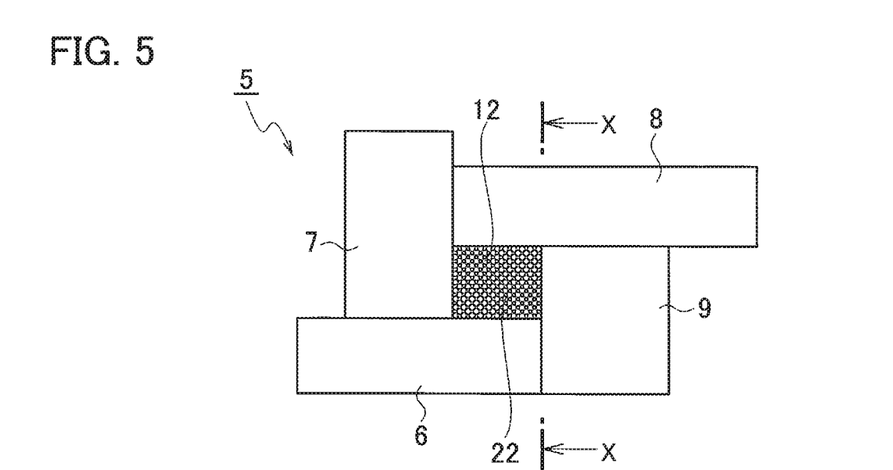
FIG. 5 is a front view of the two different-size wires bonded together between the horn and the anvil in the ultrasonic bonder.
Figure 6A:
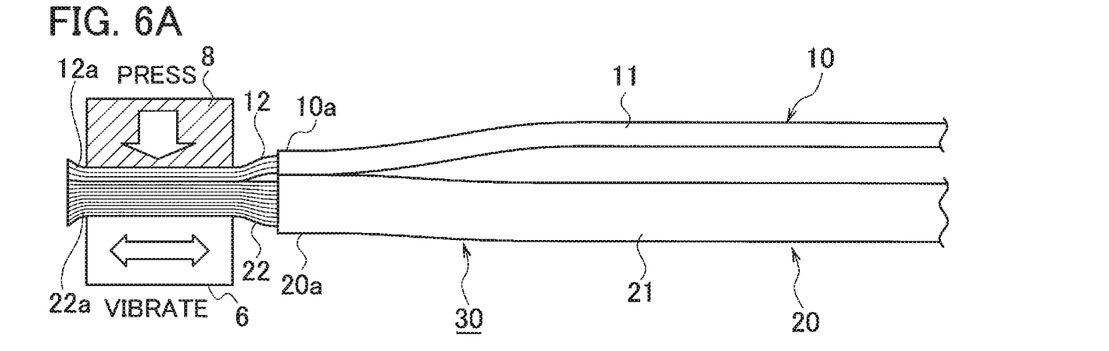
FIG. 6A is a sectional view taken along line X-X of FIG. 5.
Figure 6B:
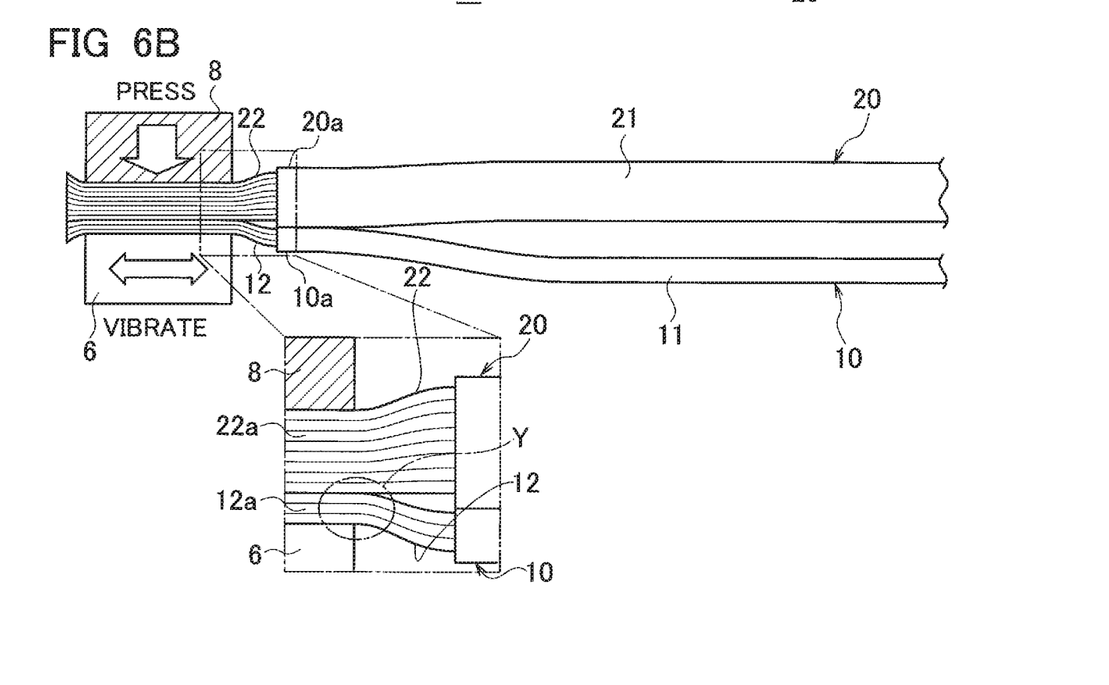
FIG. 6B is a sectional view taken along line X-X of FIG. 5 according to a comparative example.
Figure 7A:
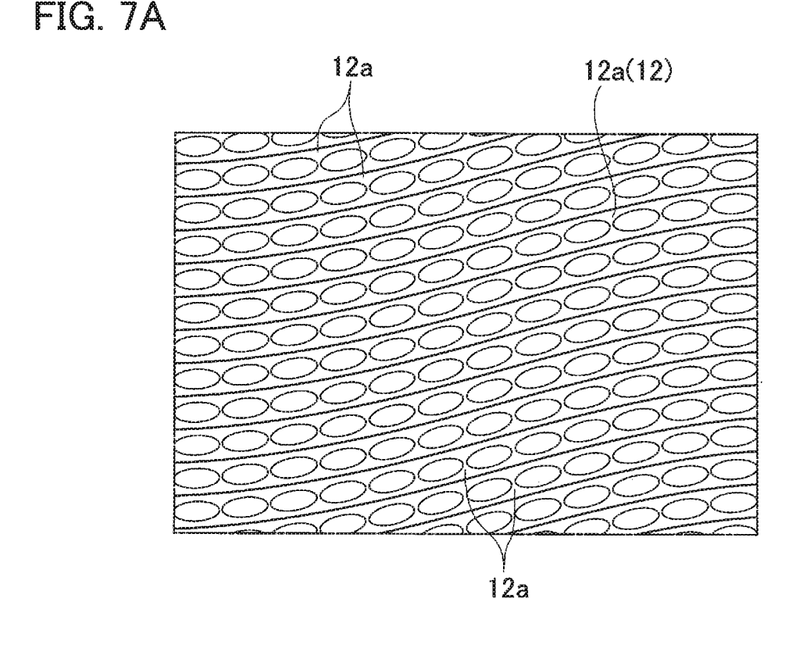
FIG. 7A is an explanatory view of the bonded state of a plurality of strands in a core located on the side of the anvil.
Figure 7B:
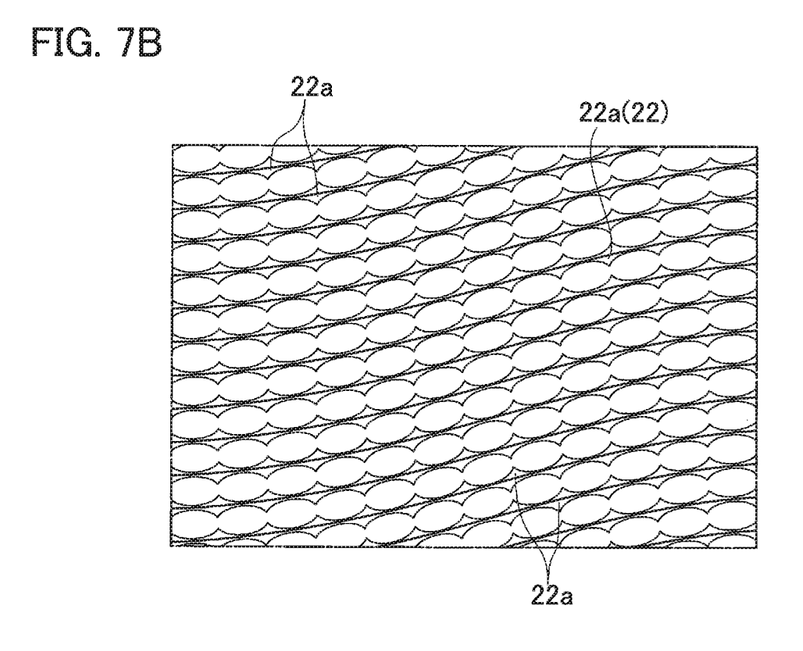
FIG. 7B is an explanatory view of the bonded state of a plurality of strands in a core located on the side of the horn.

FIG. 1A is a side view of a wire used in a wire bonding method according to a first embodiment of the present invention, and FIG. 1B is a front view of the wire. FIG. 2A is a side view of the wire having an insulating sheath peeled at a first end, and FIG. 2B is a front view of the wire having the insulating sheath peeled. FIG. 3 is a front view of two different-size wires set between a horn and an anvil in an ultrasonic bonder used in the wire bonding method. FIG. 4 is a sectional view taken along line X-X of FIG. 3. FIG. 5 is a front view of the two different-size wires bonded together between the horn and the anvil. FIG. 6A a sectional view taken along line X-X of FIG. 5, and FIG. 6B is a sectional view taken along line X-X of FIG. 5 according to a comparative example. FIG. 7A is an explanatory view of the bonded state of a plurality of strands in a core located on the side of the anvil, and FIG. 7B is an explanatory view of the bonded state of a plurality of strands in a core located on the side of the horn.

As illustrated in FIGS. 1A, 1B, 2A, and 2B, in the wire bonding method according to the first embodiment, prepared are two different-size wires of a first wire 10 and a second wire 20 each having a core (conductor) exposed by peeling of the insulating sheath at the first end. As illustrated in FIGS. 3 and 5, with the ultrasonic bonder 5 including the horn 6 for giving ultrasonic vibration, a grinding jaw 7, the anvil 8 for pressurization that receives a portion to be processed, and an anvil plate 9, the first core 12 of the first wire 10 and the second core 22 of the second wire 20 are bonded together by ultrasonic bonding between the horn 6 and the anvil 8. That is, as illustrated in FIG. 6A, the first core 12 including a plurality of strands 12a exposed from the insulating sheath 11 at the first end 10a of the first wire 10 and the second core 22 including a plurality of strands 22a exposed from the insulating sheath 21 at the first end 20a of the second wire 20 are bonded together by ultrasonic bonding between the horn 6 and the anvil 8 of the ultrasonic bonder 5, the plurality of strands 22a each being identical in thickness to each strand 12a of the first core 12, the second core 22 being larger in sectional area than the first core 12.

The respective cores 12 and 22 of the first wire 10 and the second wire 20 that bond together are identical in material. Examples of the material of the cores 12 and 22 include aluminum, aluminum alloy, copper, copper alloy, a tinned copper, and aluminum doped with carbon nanotubes. The cores 12 and 22 each may be a stranded conductor or a single core.

Next, the wire bonding method according to the first embodiment will be described. As illustrated in FIGS. 3 and 4, first, the second core 22 exposed from the insulating sheath 21 at the first end 20a of the second wire 20 is arranged on the side of the horn 6 of the ultrasonic bonder 5 and the first core 12 exposed from the insulating sheath 11 at the first end 10a of the first wire 10 is arranged on the side of the anvil 8 such that the first core 12 and the second core 22 identical in orientation overlap (setting).

Next, as illustrated in FIGS. 5 and 6A, the second core 22 exposed from the insulating sheath 21 at the first end 20a of the second wire 20 and the first core 12 exposed from the insulating sheath 11 at the first end 10a of the first wire 10 are bonded together by ultrasonic bonding with the ultrasonic vibration of the horn 6 and the pressurization of the anvil 8 between the horn 6 and the anvil 8 (bonding).

At this time, the ultrasonic vibration oscillated from the horn 6 propagates to the anvil 8 with damping in vibration. The first wire 10 having the first core 12 smaller in sectional area arranged on the side of the anvil 8, receives the vibration damped more than that of the second wire 20 having the second core 22 larger in sectional area on the side of the horn 6, and furthermore is not in direct contact with the edge portion of the horn 6. Thus, the cores 12 and 22 receive less damage (particularly, the first core 12 smaller in sectional area).

That is, as the comparative example illustrated in FIG. 6B, ultrasonic bonding of a first core 12 smaller in sectional area of a first wire 10 arranged on the side of the horn 6 and a second core 22 larger in sectional area of a second wire 20 arranged on the side of the anvil 8, together, causes a portion indicated with reference sign Y in the first core 12 smaller in sectional area, to be intensively damaged (e.g., breaking). In addition, because the strength of a bonded portion depends on the strength of the first wire 10 having the first core 12 smaller in sectional area in the bonded portion, when the first core 12 smaller in sectional area of the first wire 10 is damaged, the strength of the bonded portion deteriorates. According to the first embodiment, provided are the setting in which the second core 22 larger in sectional area of the second wire 20 is arranged on the side of the horn 6 and the first core 12 smaller in sectional area of the first wire 10 is arranged on the side of the anvil 8, and the bonding in which the first core 12 and the second core 22 are bonded together by ultrasonic bonding between the horn 6 and the anvil 8. Thus, the number of steps can be reduced in comparison to the conventional method, and the two cores 12 and 22 can be bonded together simply at low cost without breaking (particularly, the first core 12 smaller in sectional area). In addition, in comparison to the conventional method and the comparative example illustrated in FIG. 6B, the bonded portion between the cores 12 and 22 can be inhibited from deteriorating in strength, as much as possible.

As illustrated in FIG. 6A, the horn 6 propagates ultrasonic vibration energy between the plurality of strands 12a of the first core 12 of the first wire 10 and the plurality of strands 22a of the second core 22 of the second wire 20. Then, the ultrasonic vibration energy destroys and removes, for example, respective oxide films on the surfaces of the strands 12a and 22a, so that a bonded wire 30 ultrasonically bonded is acquired. In the bonded wire 30, the plurality of strands 22a of the second core 22 on the side of the horn 6 illustrated in FIG. 7B is bonded with collapse stronger than that of the plurality of strands 12a of the first core 12 on the side of the anvil 8 illustrated in FIG. 7A.

As described above, the arrangement and bonding of the first core 12 of the first wire 10 smaller in sectional area than the second core 22 of the second wire 20, on the side of the anvil 8, enables the first wire 10 and the second wire 20 to bond together with the first wire 10 having the first core 12 smaller in sectional area, inhibited from being damaged, as much as possible.

Figure 8:
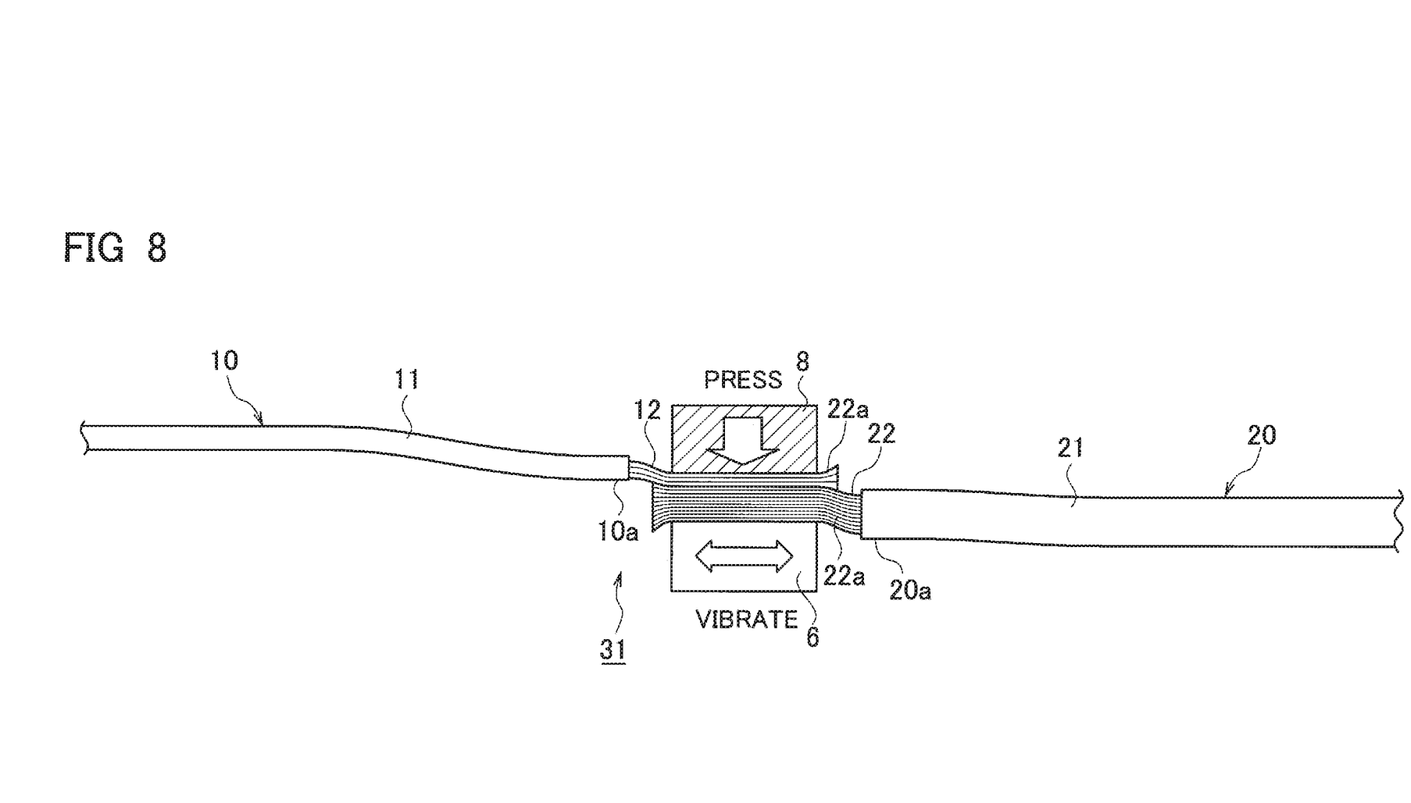
FIG. 8 is a side view of two different-size wires bonded together oppositely in orientation, according to a second embodiment of the present invention.

FIG. 8 is a side view of two different-size wires bonded together oppositely in orientation, according to a second embodiment of the present invention.

A wire bonding method according to the second embodiment is different from that according to the first embodiment in that a first core 12 smaller in sectional area of the first wire 10 and a second core 22 larger in sectional area of the second wire 20 overlapping oppositely in orientation are ultrasonically bonded together. Note that the other configurations are similar to those according to the first embodiment. Thus, the same constituent elements are denoted with the same reference signs, and the detailed descriptions thereof will be omitted.

The wire bonding method according to the second embodiment will be described. At setting, the second core 22 exposed from an insulating sheath 21 at a first end 20a of the second wire 20 is arranged on the side of a horn 6 and the first core 12 exposed from an insulating sheath 11 at a first end 10a of the first wire 10 is arranged on the side of an anvil 8 such that the first core 12 and the second core 22 overlap oppositely in orientation. At bonding, the second core 22 exposed from the insulating sheath 21 at the first end 20a of the second wire 20 and the first core 12 exposed from the insulating sheath 11 at the first end 10a of the first wire 10 are bonded together by ultrasonic bonding between the horn 6 and the anvil 8. Thus, a bonded wire 31 illustrated in FIG. 8 is completed, and function and effect similar to those according to the first embodiment are achieved.

Figure 9:
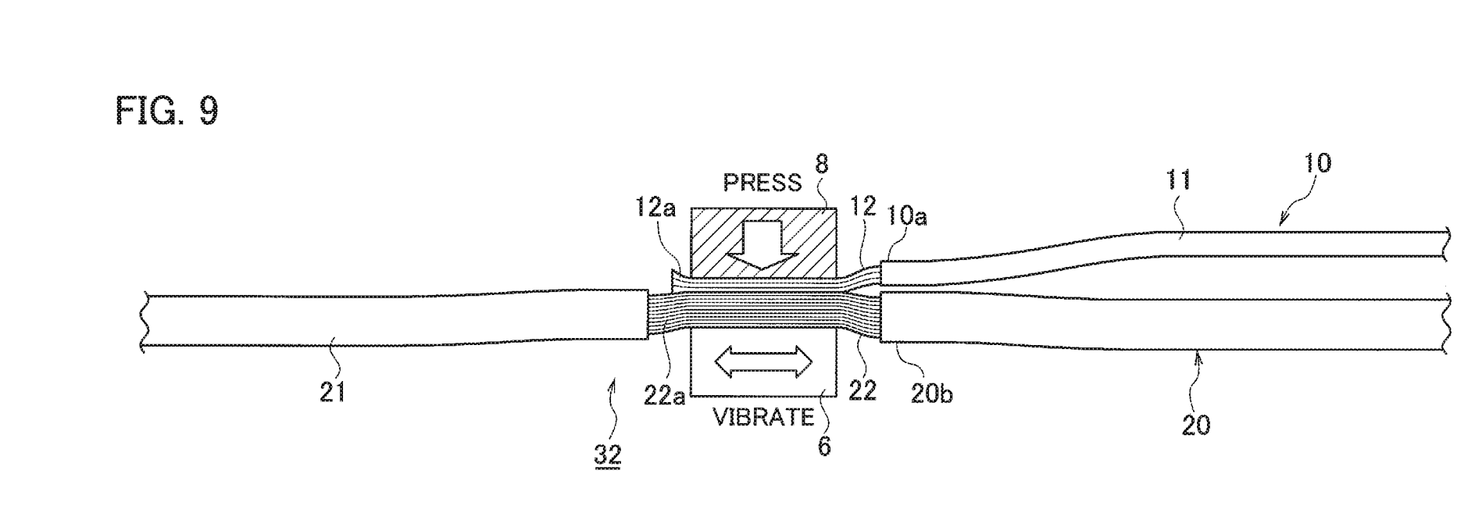
FIG. 9 is a side view of two different-size wires bonded together at an intermediate portion of one of the two wires and an end of the other wire, according to a third embodiment of the present invention.

FIG. 9 is a side view of two different-size wires bonded together at an intermediate portion of one of the two wires and an end of the other wire, according to a third embodiment of the present invention.

A wire bonding method according to the third embodiment is different from that according to the first embodiment in that a second core 22 larger in sectional area, exposed by peeling of an intermediate 20b of an insulating sheath 21 of the second wire 20 and a first core 12 smaller in sectional area, exposed from an insulating sheath 11 at a first end 10a of the first wire 10 are ultrasonically bonded together. Note that the other configurations are similar to those according to the first embodiment. Thus, the same constituent elements are denoted with the same reference signs, and the detailed descriptions thereof will be omitted.

The wire bonding method according to the third embodiment will be described. At setting, the second core 22 exposed by intermediate peeling of the insulating sheath 21 of the second wire 20 is arranged on the side of a horn 6, and the first core 12 exposed from the insulating sheath 11 at the first end 10a of the first wire 10 is arranged on the side of an anvil 8. At bonding, the second core 22 exposed by the intermediate peeling of the insulating sheath 21 of the second wire 20 and the first core 12 exposed from the insulating sheath 11 at the first end 10a of the first wire 10 are bonded together by ultrasonic bonding between the horn 6 and the anvil 8. Thus, a bonded wire 32 illustrated in FIG. 9 is completed, and function and effect similar to those according to the first embodiment are achieved.

Figure 10:
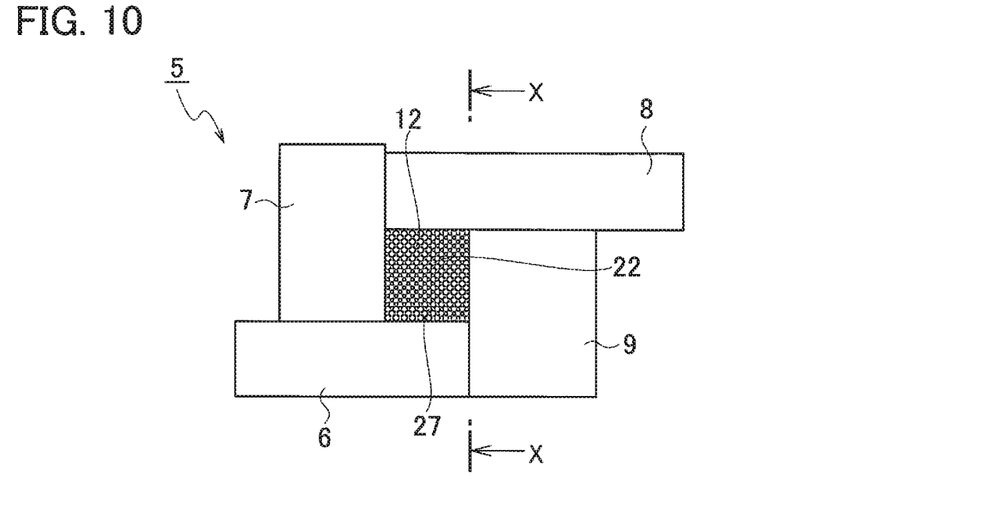
FIG. 10 is a front view of two different-size wires and a dummy wire bonded together between a horn and an anvil in an ultrasonic bonder used in a wire bonding method according to a fourth embodiment of the present invention.
Figure 11:
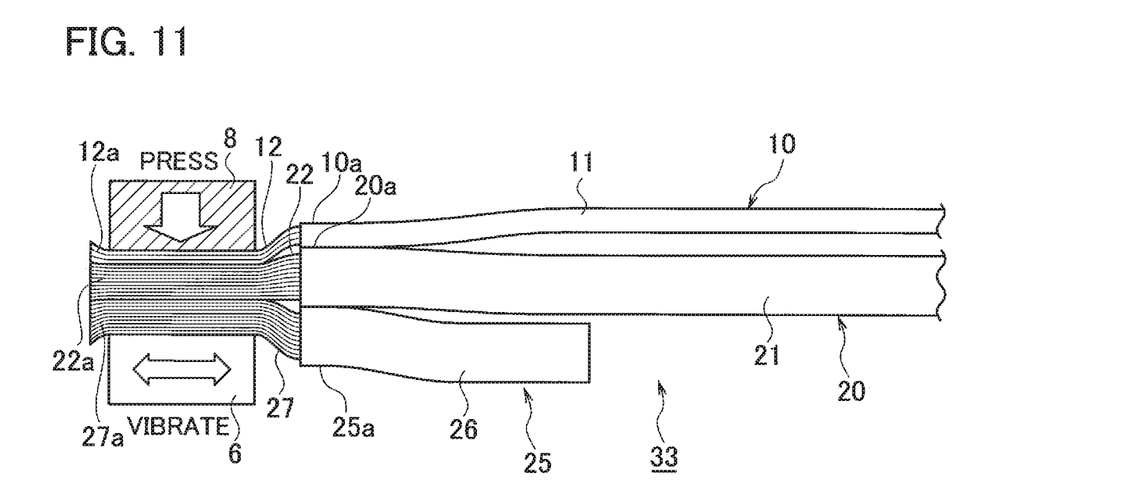
FIG. 11 is a sectional view taken along line X-X of FIG. 10.

FIG. 10 is a front view of two different-size wires and a dummy wire bonded together between a horn and an anvil in an ultrasonic bonder used in a wire bonding method according to a fourth embodiment of the present invention. FIG. 11 is a sectional view taken along line X-X of FIG. 10.

The wire bonding method according to the fourth embodiment is different from that according to the first embodiment in that a core 27 including a plurality of strands 27a exposed from an insulating sheath 26 at a first end 25a of the dummy wire 25 for damping ultrasonic vibration from the horn 6 to the first wire 10 and the second wire 20, is arranged on the side of the horn 6 with respect to a second core 22, for ultrasonic bonding. Note that the other configurations are similar to those according to the first embodiment. Thus, the same constituent elements are denoted with the same reference signs, and the detailed descriptions thereof will be omitted.

The wire bonding method according to the fourth embodiment will be described. At setting, the core 27 exposed from the insulating sheath 26 of the dummy wire 25 for damping propagation of ultrasonic vibration from the horn 6 to the first wire 10 and the second wire 20, is arranged intermixedly on the side of the horn 6 with respect to the second core 22 of the second wire 20. At bonding, a first core 12, the second core 22, and the core 27 of the dummy wire 25 are bonded together by ultrasonic bonding between the horn 6 and the anvil 8. Thus, a bonded wire 33 illustrated in FIG. 11 is completed, and function and effect similar to those according to the first embodiment are achieved. In particular, bonding can be performed with as small damage as possible to the first wire 10 and the second wire 20 (e.g., breaking). The cores can be inhibited from breaking due to the horn 6 that directly abuts on the cores.

Note that, according to each embodiment, the wires having the respective cores identical in material are bonded together, but the wires having the respective cores different in material may be bonded together. For example, in a case where a copper (Cu) wire and an aluminum (Al) wire are bonded together, the Cu wire is arranged on the side of the horn for bonding. Furthermore, the number of wires is not limited to two. For example, in a case where three wires of two thin Cu wires and one thick Al wire are bonded together, each thin Cu wire is arranged on the side of the horn for bonding.

What is claimed is:

1. A wire bonding method comprising:
    arranging a first core including a plurality of strands exposed from an insulating sheath of a first wire, onto a side of an anvil for ultrasonic bonding and a second core including a plurality of strands exposed from an insulating sheath of a second wire, onto a side of a horn for ultrasonic bonding, the second core being larger in sectional area than the first core; and
    bonding the first core and the second core together by ultrasonic bonding between the horn and the anvil,
    wherein the placement of the first core on the side of the anvil and the placement of the second core on the side of the horn minimizes deterioration of the bond between the first core and the second core.

2. The wire bonding method according to claim 1, wherein
    the arranging includes arranging the second core exposed from the insulating sheath at a first end of the second wire onto the side of the horn and the first core exposed from the insulating sheath at a first end of the first wire onto the side of the anvil, and
    the bonding includes bonding the second core exposed from the insulating sheath at the first end of the second wire and the first core exposed from the insulating sheath at the first end of the first wire together by ultrasonic bonding between the horn and the anvil.

3. The wire bonding method according to claim 1, wherein
    the second core exposed from the insulating sheath of the second wire is exposed by intermediate peeling of the insulating sheath of the second wire
    the arranging includes arranging the second core exposed from the insulating sheath of the second wire onto the side of the horn and the first core exposed from the insulating sheath at a first end of the first wire onto the side of the anvil, and
    the bonding includes bonding the second core exposed by the intermediate peeling of the insulating sheath of the second wire and the first core exposed from the insulating sheath at the first end of the first wire together by ultrasonic bonding between the horn and the anvil.

4. The wire bonding method according to claim 1, wherein
    the arranging includes arranging a core exposed from an insulating sheath of a dummy wire onto the side of the horn with respect to the second core, which is larger in sectional area than the first core, and the bonding includes bonding the first core, which is smaller in sectional area than the second core, the second core, and the core of the dummy wire together by ultrasonic bonding between the horn and the anvil.

5. A bonded wire comprising:
a first wire having a first core including a plurality of strands exposed from an insulating sheath of the first wire; and
a second wire having a second core including a plurality of strands exposed from an insulating sheath of the second wire, the second core being larger in sectional area than the first core, wherein
the first core and the second core are bonded together by ultrasonic bonding between a horn and an anvil for ultrasonic bonding with the second core arranged on a side of the horn and the first core arranged on a side of the anvil,
the plurality of strands of the second core on the side of the horn is bonded with collapse stronger than collapse of the plurality of strands of the first core on the side of the anvil, and
the placement of the first core on the side of the anvil and the placement of the second core on the side of the horn minimizes deterioration of the bond between the first core and the second core.

\* \* \* \* \*